Nov. 5, 1963

R. M. LEFEVER 3,109,391

OVEN LOADER

Filed Sept. 28, 1960

INVENTOR.
RICHARD M. LEFEVER
BY
Otto Moeller
Attorney

INVENTOR.
RICHARD M. LEFEVER
BY
Otto Moeller
Attorney

Nov. 5, 1963  R. M. LEFEVER  3,109,391
OVEN LOADER

Filed Sept. 28, 1960  3 Sheets-Sheet 3

INVENTOR.
RICHARD M. LEFEVER
BY
Otto Moeller
Attorney

United States Patent Office 3,109,391
Patented Nov. 5, 1963

3,109,391
OVEN LOADER
Richard M. Lefever, York, Pa., assignor, by mesne assignments, to Baker Perkins Inc., New York, N.Y., a corporation of New York
Filed Sept. 28, 1960, Ser. No. 58,975
9 Claims. (Cl. 107—57)

This invention relates to oven loading means for pushing successive rows of pans of dough from a loading shelf in front of the oven through an opening in the front wall thereof onto a traveling conveyor that carries the pans of dough through the oven heating chamber for baking the contents of the pans. Preferably, the pan supporting shelf includes a horizontal transversely extending conveyor for delivering the pans of dough in front of the oven opening in position to be loaded into the oven by the pusher member of the oven loading means.

In a preferred form of oven loader, the pusher member is arranged to be moved along a lower run in a rearward direction in close proximity to the pan supporting shelf for pushing the pans onto the oven conveyor and then along an upper run in a forward direction above the level of pans of dough which are being delivered onto the pan supporting shelf in readiness to be pushed into the oven upon the next rearward movement of the pusher member. An object of the invention resides in the provision of an oven loading means of the type described, wherein the pusher member at the end of its pan pushing stroke, is retracted from engagement with the pans as it moves from its lower to its upper run, whereby to prevent dislocation of the pans and importantly to prevent engagement of the pusher member beneath the protruding lip or upper edge of the pans to prevent tilting, jarring and dislocation of the pans.

In loading means of the aforementioned type, the pusher bar is customarily provided at its ends with carriage means for supporting the bar from laterally spaced, longitudinally extending endless chain conveyors trained over fore and aft disposed sprockets. An object of the present invention is to provide loading means of the aforementioned type so constructed and arranged to provide guide supports for both the top and bottom runs of the chains to eliminate slack in the chains and consequent pulsating operation of the pusher bar resulting in smoother operation thereof.

In loading means of the type above described wherein the loading pusher member and its carriages are pivotally supported from the endless chains, it is another object to eliminate free swinging or pendulous motion of the carriages and pusher member throughout their path of travel and providing a positive and smoother motion of the carriages and pusher member throughout their travel in the paths dictated by the chains.

It is a further object of the invention to provide novel loading means of the type described that is compact, simple in construction and efficient in operation, and that is adapted for use with a traveling hearth or traveling tray type oven, and wherein the pans to be loaded may be delivered manually or by mechanical conveying means into position to be loaded by the loading means.

Other objects and advantages more or less ancillary to the foregoing and the manner in which all of the various objects are realized will become apparent in the following description which, considered in connection with the accompanying drawings, sets forth the preferred embodiment of the invention.

Figure 1:
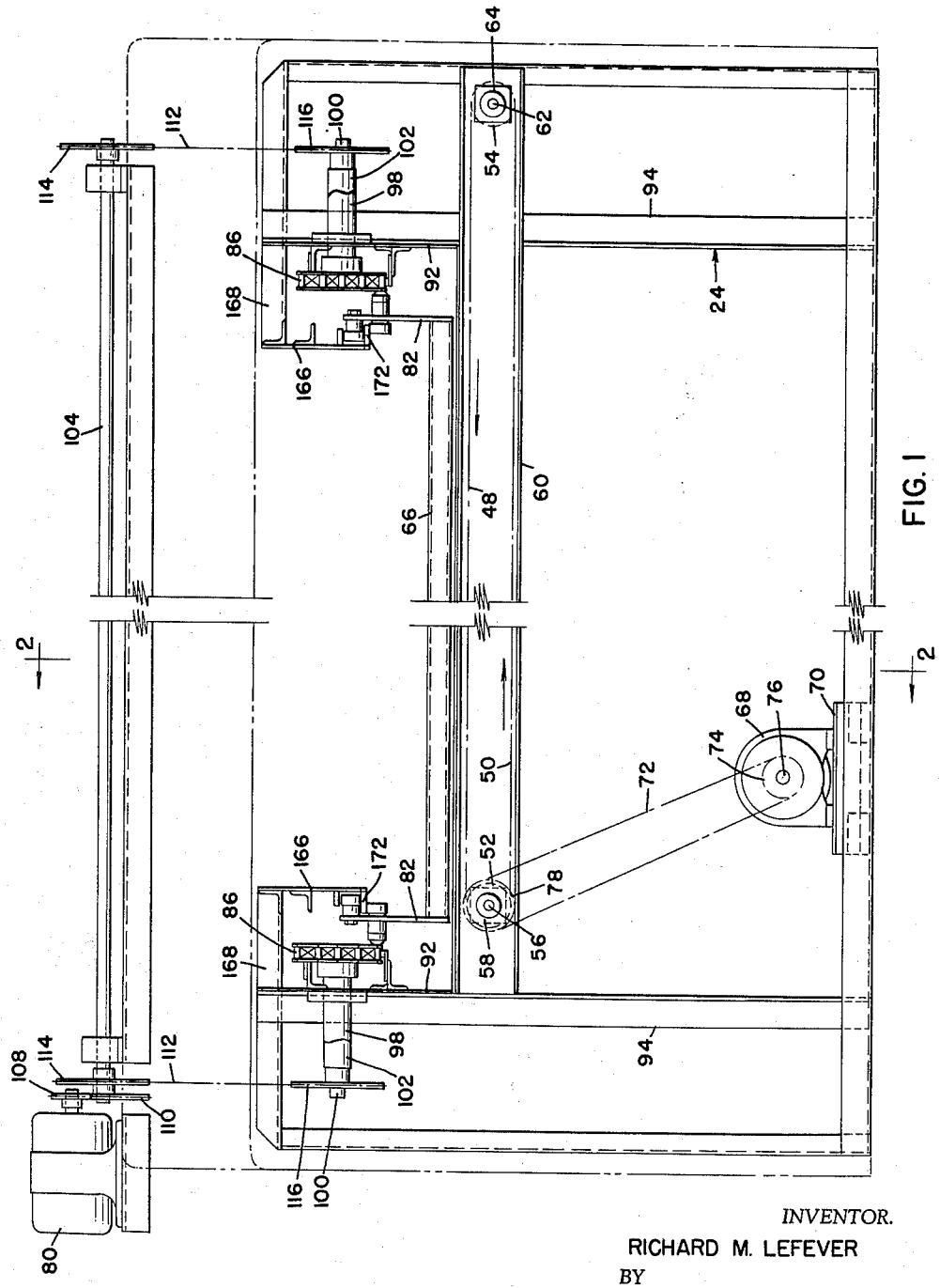
FIGURE 1 is a view in front end elevation of the loading device embodying the present invention, and shown in operative relation to a baking oven, with enclosing panel members removed but indicated in phantom.

Referring to the drawings, the loading device 20 is shown as forming a unitary part of the oven 22, though it is obvious that it may be formed as a separable portable unit capable of being moved into or out of operative association with the front of the oven. The loading device 20 includes a generally rectangular upright supporting frame 24, made up of angle irons and other structural elements.

The rearward portion of the loading device 20 projects through an opening 26 in the oven front wall 28 for pushing pans of dough P onto an articulated traveling hearth 30. The articulated traveling hearth 30 is led at one end around a pair of laterally spaced conveyor sprockets, one such sprocket 32 at the far side of the oven being shown in FIGURE 2, the sprockets 32 being mounted on a transversely extending shaft 34 disposed in the lower forward portion of the oven 22. A similar shaft and sprocket arrangement, not shown, is provided for the other end of the articulated traveling hearth in the lower rearward portion of the oven. The sprockets 32 and the similar sprockets at the other end of the oven receive conveyor chains 36 carrying hearth members 38, which may be of conventional plate or grid construction, arranged to be articulately connected by the conveyor chains so that the hearth members 38 in the upper run of chain will produce a substantially continuous oven floor.

Disposed transversely of the oven approximately in line with the oven front wall 28 is a partition plate 40, the upper end of which defines the lower marginal edge of the oven opening 26, through which opening 26 the forward portion of the loader projects, as previously explained.

The loader includes a generally horizontal pan support 42 including an outer pan support section 44 extending rearwardly from the upper edge of the partition plate 40 and supported by the frame 24, and an inner pan support section 46 extending forwardly from the upper edge of the partition plate 40, and to which plate it may be rigidly or hingedly secured. The loader functions, as will be described hereinafter, to push the pans from the outer pan support section 44 across the inner pan support section 46 onto the traveling hearth 30 of the oven.

The outer pan support section 44 includes a transversely extending conveyor 48, preferably of the endless type, for delivering successive rows of pans into position in front of the oven preparatory to being loaded into the oven. As shown, the conveyor 48 is of the slat type, the slats of which are attached at their ends to a pair of spaced transversely extending endless chains 50. Each of the chains 50 is trained at one end around a sprocket 52 and at its other end around a sprocket 54. The sprockets 52 are fixed on a longitudinally extending shaft 56 journaled in suitable bearings 58 carried by transversely extending channel members 60 of the frame 24, while sprockets 54 are fixed on a longitudinally extending shaft 62 journaled in suitable bearings 64 also carried by the channel members 60.

As shown in FIGURE 1, the right hand end of the conveyor 48 extends to the outermost side of the frame 24, for receiving pans, preferably from another conveyor, not shown, so that with the conveyor 48 traveling in the direction of the arrows, successive rows of pans are moved into position for engagement by the pusher bar 66 of the loading device.

The conveyor 48 is operated by a motor 68 mounted on a bracket 70 within the lower portion of the frame 24, and the drive means includes a chain 72 trained over a sprocket 74 on the motor shaft 76 and a sprocket 78 on an extension of the conveyor shaft 56.

Mounted on the oven 22 at one side thereof is a motor 80 for actuating the pusher bar 66, which is caused to be moved, by means hereinafter described, in a rearward direction or pan pushing stroke along a lower run in relatively close proximity to the surface of the pan support 42, and is further caused to be moved in an elevated forward direction or retracting stroke above the level of the pans, in a cylic manner.

The transversely extending pusher bar 66 is supported at its ends by the free end of the arm 82 of each of a pair of V-shaped carriages 84. The V-shaped carriages 84 are pivotally connected at their vertices to respective laterally spaced longitudinally extending endless roller chains 86 in a manner described hereinafter in detail. Each of the chains 86 is trained at one end around a sprocket 88 adjacent the forward end of the pan support 42 and in vertical spaced relation with respect thereto; and each of the chains 86 is trained at its other end around a sprocket 90 adjacent the rearward end of the pan support 42 also in vertical spaced relation with respect thereto.

Each pair of sprockets 88, 90 and its chain 86 entrained thereover is disposed adjacent the inner side of a vertically disposed longitudinally extending plate 92. The plates 92 are transversely spaced a distance apart sufficient to receive the pusher bar 66 therebetween, being secured in any suitable manner to inner upright frame members 94 of the framework 24. The plates 92 are disposed directly over the upper surface of the pan support 42 and project slightly therebeyond at each end, and the portion of the plate 92 at the right side, as viewed in FIGURE 1, over the transversely extending conveyor 48 is recessed in order to permit pans of dough to be conveyed into the path of the pusher bar 66.

The sprockets 88 are mounted on short shafts 96 journaled in bearings 98 secured to and extending through the forward portions of the plates 92, and the sprockets 90 are mounted on short shafts 100 journaled in bearings 102 secured to and extending through the rearward portions of the plates 92. The described mounting of the shafts and sprockets is such that the chains 86 entrained over the sprockets 88 and 90 are spaced above the pan support 42 a sufficient distance so that the pusher bar 66, which is connected with the chains 86 through the carriages 84, will be at a sufficient height above the pan support on its forward or retracting stroke to clear the pans that are being advanced by the transversely extending pan conveyor 48.

Figure 2:
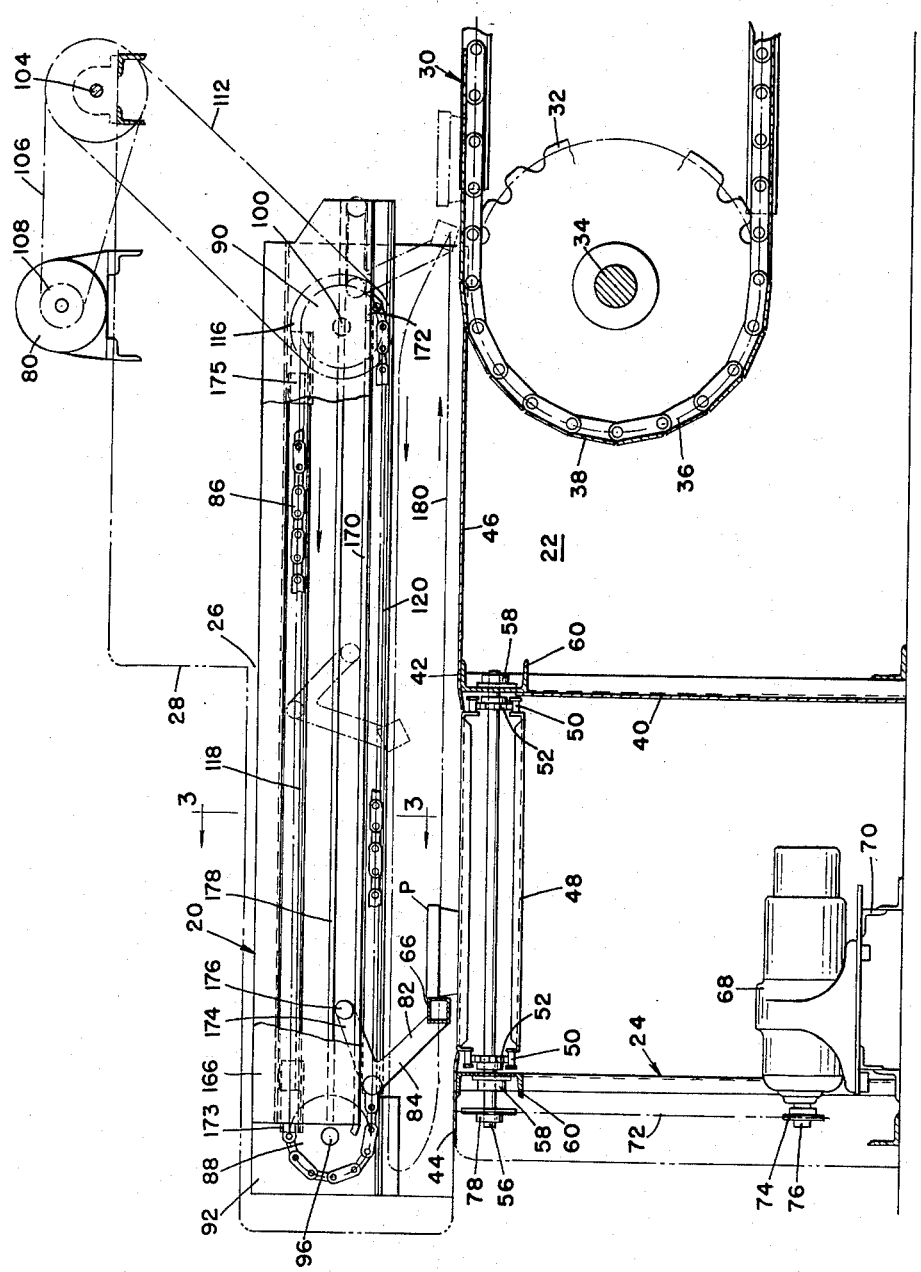
FIGURE 2 is a vertical longitudinal sectional view through the loading device and the forward end portion of a baking oven and taken on the line 2—2 of FIGURE 1.

The chains 86 are driven in the direction of the arrow in FIGURE 2, and the drive means includes a transversely extending shaft 104 suitably mounted on the oven for rotation by a chain 106 trained over a sprocket 108 on the shaft of the motor 80 and a sprocket 110 on one end of the shaft 104. Chains 112 trained over sprockets 114 fixed on the opposite ends of the shaft 104 and also trained over sprockets 116 fixed on extensions of the shafts 100 complete the drive means for operating the chains 86.

Figure 3:
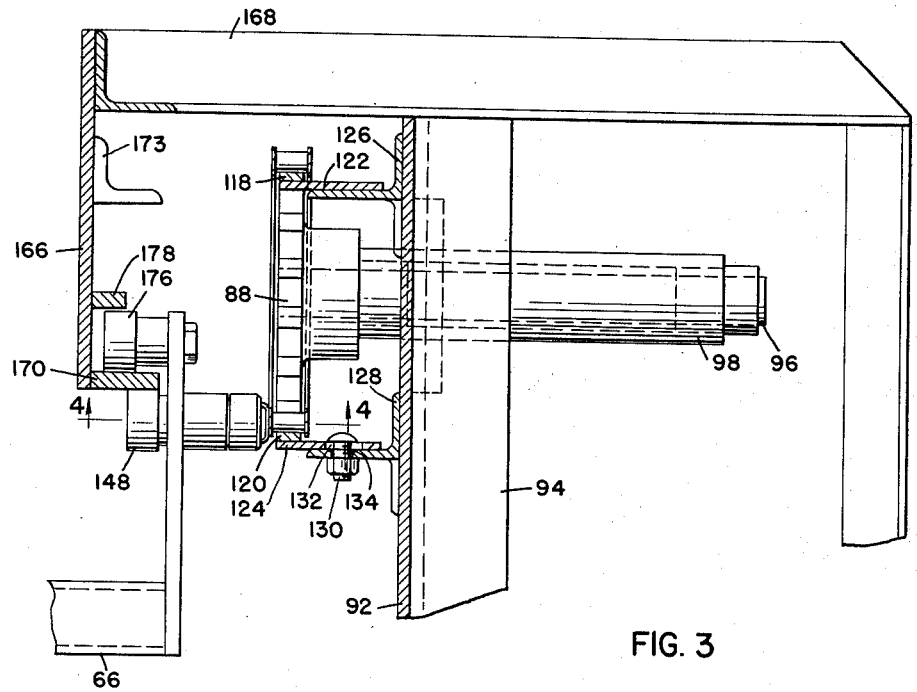
FIGURE 3 is an enlarged sectional view taken on line 3—3 of FIGURE 2 adjacent the far side thereof, it being understood that the construction on the near side is identical.

The upper run of each of the roller chains 86 is guided on and rolls over a longitudinally extending track member 118 and the lower run of each of the roller chains 86 is guided on and rolls over a longitudinally extending track member 120. The track members 118 as well as the track members 120 are arranged to be supported from and in laterally inwardly spaced relation with respect to the plates 92, and are further arranged for lateral adjustment. Referring particularly to FIGURE 3, the track members 118 and 120 are secured in any suitable manner on the lateral inner ends of the longitudinally extending horizontal plate members 122 and 124. The lateral outer end portions of the plate members 122 and 124 are laterally adjustably secured to the horizontal legs of angle members 126 and 128, which in turn are rigidly secured to the plate 92. A bolt 130 extending through a laterally elongated slot 132 in the plate member 124 and an opening 134 in the horizontal leg of the angle member 128 provides for lateral adjustment of the track 120. Such a bolt, slot and hole arrangement is preferably provided adjacent each end of the plate member 124 and angle member 128, and a similar arrangement, not shown, is provided for the upper plate 122 and angle member 126. While in FIGURE 3, the above arrangement is shown on one side of the apparatus, it is understood that the same arrangement is provided at the other side thereof.

Figure 4:
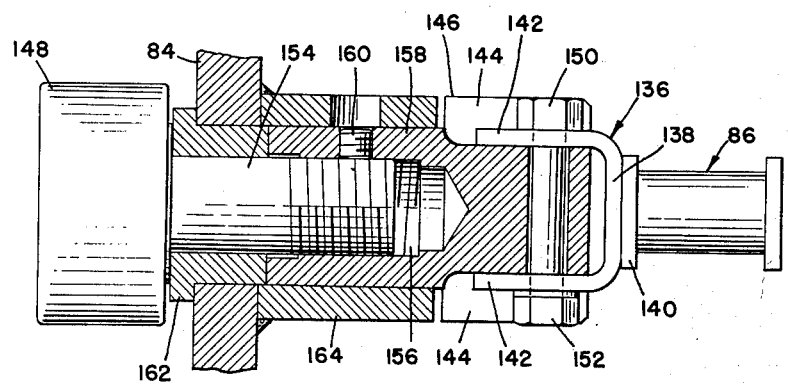
FIGURE 4 is an enlarged sectional view taken on line 4—4 of FIGURE 3.

As previously stated, the V-shaped carriages 84 of the pusher mechanism are pivotally connected at their vertices to respective roller chains 86. The pivotal connection of one of the carriages 84 will now be described with particular reference to FIGURES 3 and 4, it being understood that this arrangement is duplicated at the opposite side of the apparatus.

A U-shaped attachment member 136 is rigidly secured along its base 138 to the inner face of a link 140 of the chain 86, and the arms 142 of the member 136 are arranged to be received in the diametrically opposed external axially extending grooves 144 in the outer end portion of a horizontal laterally extending stud 146, the inner end of which carries a roller 148. A cap screw 150 extending through the arms 142 of the attachment member 136 and the outer end portion of the stud 146, and a nut 152 on the projecting end of cap screw 150 rigidly secures the stud 146 to the attachment member 136, the axis of the stud 146 being in horizontal alinement with the center line of the chain link.

The stud 146 is preferably made in two parts, the inner stud portion 154 being threaded in an internally threaded axial recess 156 in the outer stud portion 158. A set screw 160 secures the stud portions 154 and 158 in desired relative position. The inner stud portion 154 is provided with a bushing 162 between the roller 148 and the inner end of the outer stud portion 158, on which the carriage 84 is pivotally mounted at its vertex. A sleeve 164 welded to the carriage 84 surrounds the inner end portion of the outer stud portion 158.

Disposed inwardly of and in parallel spaced relation with respect to the chain support plates 92 are roller guide and support plates 166. The plates 166 are pendently supported from transverse frame members 168 of the frame 24 and terminate at their lower edges a substantial distance above the plane of the pan support 42. Extending outwardly of the lower edges of the plates 166 are longitudinally extending roller guide tracks 170 which extend rearwardly from a point in approximate vertical alinement with the shafts 96 of the sprockets 88 to a point beyond the shafts 100 of the sprockets 90, as best shown in FIGURE 2. The rollers 148 of the carriages 84 are arranged to engage the outer bottom surface of the guide tracks 170, as best shown in FIGURE 3. The portion of the guide tracks 170 from a point in vertical alinement with the shafts 100 of the sprockets 90 to the rearward end thereof are recessed as indicated at 172 in FIGURES 1 and 2 to permit the rollers 148 to be carried upward by the chains 86 as the latter pass over the sprockets 90.

The upper chain guides 118, previously referred to, extend between the sprockets 88 and 90, and referring particularly to FIGURE 2 which shows one of the chain guides 118, such chain guide 118 must necessarily terminate at its ends a distance short of the sprockets 88 and 90. In order to prevent sagging of the chain 118 and the carriage 84 by reason of the weight of the carriage and the pusher bar 66 carried thereby as the chain 118 passes over the spaces between the sprockets 88 and 90 and the chain guide 118, with consequent pulsating operation, short guide members 173 and 175 are secured, in suitable manner, to the guide support plate 166 opposite the aforementioned spaces for supporting the roller 148. It is understood that a similar arrangement of guide members 173 and 175 is provided at the opposite side of the apparatus.

As previously described, the free ends of the arms 82 of the V-shaped carriages 84 support the transverse pusher bar 66. The other arms 174 of the carriages 84 each supports a roller 176 at its free end which, as best shown in FIGURE 3, is offset inwardly of the roller 148. The rollers 176 are confined between the guide tracks 170 and the guide tracks 178. The guide tracks 178 are rigidly secured to the plates 166 in spaced relation above the tracks 170 and are coextensive in length therewith. The guide tracks 178 project laterally from the plates 166 a distance to provide bearing surfaces for the rollers 176 and that will permit the rollers 148 to clear the tracks 178 as they are carried upward by the chains 86 as the latter pass over the sprockets 90.

Referring to FIGURE 2, it is apparent, with the pattern of movement of the rollers 148 and 176 described above, the pusher bar 66 follows the path designated by the broken line 180, the pusher bar 66 acting to push pans across the conveyor section 48 and the pan support section 46 during movement of the carriages 84 from left to right along the lower runs of the chains 86. Since the studs 146 which carry the carriages 84 are in axial alinement with the center line of the chains 86, as previously described, it will be seen that the pull of the chains 86 on the carriages provide the most efficient distribution of forces.

After reaching the end of its pushing stroke, the pusher barr 66, as clearly shown in FIGURE 2, is retracted at a sharp angle as the pivotally mounted vertices of the carriages 84 follow the arcuate paths of the chains 86 as the latter travel about the peripheries of their respective sprockets 90. The sharp angle of retraction of the pusher bar 66 prevents engagement thereof beneath the protruding lip or upper edge of the pans to insure against tilting, jarring and dislocation of the pans at the end of the pan pushing stroke.

As the vertices of the carriages 84 are moved by the chains 86 along their upper runs, the pusher bar 66 moves to retracted position above any pans on the conveyor 48. At the end of the retracting stroke, the vertices of the carriages 84 follow the downward arcuate paths of the chains 86 as the latter travel about the peripheries of their respective sprockets 88, thereby causing the pusher bar 66 to be lowered into position for another cycle.

While the loading means has been shown for purpose of illustration as applied to a tunnel type oven, it is apparent that it is equally adaptable for loading pans of dough onto the trays of a traveling tray type oven of the type shown, for example, in Royer Patent No. 2,931,322, granted April 5, 1960.

Although I have disclosed an exemplary embodiment of my invention herein, it will be understood that various changes, modifications and substitutions may be incorporated in such embodiment without departing from the spirit of the invention.

I claim:

1. A reciprocating transfer device for slidingly moving articles forwardly from a first article support onto an adjacent second article support including, a pair of parallel laterally spaced endless chains disposed above said first support defining closed loops having upper and lower runs with said lower runs disposed a distance above said support exceeding the height of the articles to be slidingly moved thereacross, means for unidirectionally driving said chains, a guide track laterally adjacent each of said endless chains between the levels of and parallel with respect to the upper and lower runs thereof, a V-shaped carriage mounted on each endless chain having a pivotal connection therewith at its vertex, a roller carried at the free end of one of the arms of each of said carriages engageable in a respective guide track for rectilinear movement therein and fixed against vertical displacement, and a transversely extending pusher bar secured at its opposite ends to the free ends of the other of the arms of said V-shaped carriages, said vertices being disposed rearwardly relatively to said arms as the carriages move forwardly, and operation of said chains imparting movement to said carriages whereby said pusher bar defines a path of travel over and in close proximity to said first article support to push articles therefrom onto said second article support as the pivotally connected vertices of said carriages move along the lower runs of said chains, and a path of travel in the opposite direction at an elevation above any articles on said first article support as the pivotally connected vertices of said carriages move along the upper runs of said chains.

2. The combination as set forth in claim 1 including a roller carried by the vertex of each of said carriages bearing against the under side of a respective guide track to prevent upward displacement of the vertices of said carriages upon impact of said pusher bar with an article on said first article support.

3. A device in accordance with claim 1 wherein the axes of the pivotal connections of the vertices of said carriages coincide with the center lines of their respective chains.

4. An oven loading device comprising, a loading platform at the entry end of an oven and in the substantially horizontal plane of the upper run of a traveling hearth, a transversely extending pusher bar, means for guiding said pusher bar along a closed path including a loading leg in close proximity to said loading platform for pushing pans from said platform onto said traveling hearth and a return leg at an elevation above said pans, said means including a pair of laterally spaced longitudinally extending endless chains disposed above said platform defining closed loops having upper and lower runs with the lower runs of each of said chains being disposed a distance above said loading platform exceeding the height of said pans, a pair of V-shaped carriages each pivotally supported at its vertex by a respective chain, a roller carried at the free end of one of the arms of each of said V-shaped carriages, a longitudinally extending rectilinear guide track laterally adjacent each of said endless chains between the levels of the upper and lower runs thereof, each of said rollers being engaged in a respective guide track rearward of the pivotally mounted vertices of said carriages for rectilinear movement therein and fixed against vertical displacement, the other of the arms of each of said V-shaped carriages extending in a downward direction from the vertices thereof at an acute angle with respect to said first named arms and arranged at their free ends to support said transversely extending pusher bar, and means for unidirectionally driving said chains for moving said pusher bar along the said legs of said closed path.

5. A loading device for use with a baking oven of the type comprising a baking chamber provided with a loading opening, a conveyor in the chamber adapted to travel in close proximity to the loading opening and a substantially horizontally disposed pan support extending through said opening and including an outer support section without the oven and an inner support section in said chamber between said opening and said conveyor; said loading device comprising a pair of laterally spaced longitudinally extending endless chains disposed above said pan support defining closed loops having upper and lower runs, means for driving said chains, a pair of vertically spaced longitudinally extending rectilinear track members laterally adjacent each endless chain between the upper and lower runs thereof, a V-shaped carriage mounted on each endless chain having a pivotal attachment thereto at its vertex, a roller carried at the free end of each of one of the arms of said V-shaped carriages, each of said rollers being engageable between a respective pair of vertically spaced track members for rolling movement therealong and being constrained therebetween against vertical movement, and a transversely extending pusher bar secured at its opposite ends to the free ends of the other arms of said V-shaped carriages, said vertices being disposed outwardly relatively to said arms as the carriages move inwardly, said rollers providing a fulcrum about which the pivotally mounted vertices of said carriages swing as said vertices are moved by said chains from one to the other of the runs of said chains to effect movement of said pusher bar across said pan support in a path in close proximity thereto for pushing pans from said support onto said conveyor as the vertices of said carriages are moved by said chains along their lower runs and to effect movement of the pusher bar in an elevated path as the vertices of said carriages are moved by said chains along their upper runs.

6. A loading device in accordance with claim 5, wherein said outer pan support section includes a transversely extending conveyor for moving a row of pans into the path of movement of said transversely extending pusher bar.

7. An oven loading device comprising, a loading platform at the entry end of an oven including a conveyor for feeding a row of pans transversely in front of said oven, a transversely extending pusher bar, means for guiding said pusher bar along a closed path including a loading leg in close proximity to said loading platform for pushing a row of pans forwardly from said platform into said oven and a return leg at an elevation above said pans, said means including a pair of laterally spaced longitudinally extending endless chains disposed above said platform defining closed loops having upper and lower runs with said lower runs disposed above the pans on said platform, means for unidirectionally driving said chains, a pair of V-shaped carriages each pivotally supported at its vertex by a respective chain, a roller carried at the free end of one of the arms of each of said V-shaped carriages, a longitudinally extending rectilinear guide track laterally adjacent each of said endless chains between the levels of the upper and lower runs thereof, each of said rollers being engaged in a respective guide track for rectilinear movement therein throughout movement of said V-shaped carriages by said endless chains, the other of the arms of each of said V-shaped carriages extending in a downward direction from the vertices of said V-shaped carriages and arranged at their free ends to support said transversely extending pusher bar for movement thereof along the said legs of said closed path, the vertices of said carriages being rearwardly disposed relatively to said arms as the carriages move forwardly.

8. A reciprocating transfer device for slidingly moving articles forwardly from a first article support onto a second article support including: at least one endless chain disposed above said first support and defining a closed loop having an upper and lower run; means for driving said chain; a guide track generally parallel with the endless chain; an angle-shaped carriage mounted by said endless chain; means pivotally connecting the vertex of said angle-shaped carriage with said chain; a guide member carried at the free end of one of the arms of the carriage engageable in said guide track for rectilinear movement therein and fixed against vertical displacement; and a pusher secured to the free end of the other arm of said angle-shaped carriage, said vertex being disposed rearwardly relative to said guide member as said carriage moves forwardly and operation of said chain imparting movement to said carriage whereby said pusher pushes an article from said first support to said second support as the pivotally connected vertex moves forwardly, and returns rearwardly in a path of travel at an elevation above any articles on said first article support as the pivotally connected vertex moves rearwardly.

9. A reciprocating transfer device for slidingly moving articles forwardly from a first article support onto a second article support including: at least one endless chain disposed above said first support and defining a closed loop having an upper and lower run; means for driving said chain; a guide track generally parallel with the endless chain; a pusher; a carriage mounted by said endless chain including a guide member mounted thereon and a dependent part connected to said pusher; means pivotally connecting said carriage with said chain; the point of connection of said last means to said carriage being disposed rearwardly of said guide member as said carriage moves forwardly; the guide member being engageable in said guide track for rectilinear movement therein and fixed against vertical displacement and operation of said chain imparting movement to said carriage whereby said pusher bar pushes an article from said first support to said second support and returns rearwardly in a path of travel at an elevation above any articles on said first article support.

References Cited in the file of this patent
UNITED STATES PATENTS

| | | |
|---|---|---|
| 528,745 | Storle | Nov. 6, 1894 |
| 2,436,052 | Mueller et al. | Feb. 17, 1948 |
| 2,900,927 | Engels et al. | Aug. 25, 1959 |
| 2,931,322 | Royer | Apr. 5, 1960 |
| 2,980,038 | Royer | Apr. 18, 1961 |